United States Patent
Bhan

(10) Patent No.: US 9,114,386 B2
(45) Date of Patent: *Aug. 25, 2015

(54) SELF-ACTIVATING HYDROPROCESSING CATALYST AND PROCESS FOR TREATING HEAVY HYDROCARBON FEEDSTOCKS

(71) Applicant: SHELL OIL COMPANY, Houston, TX (US)

(72) Inventor: Opinder Kishan Bhan, Katy, TX (US)

(73) Assignee: Shell Oil Company, Houston, TX (US)

( * ) Notice: Subject to any disclaimer, the term of this patent is extended or adjusted under 35 U.S.C. 154(b) by 139 days.

This patent is subject to a terminal disclaimer.

(21) Appl. No.: 13/660,879

(22) Filed: Oct. 25, 2012

(65) Prior Publication Data

US 2014/0116924 A1 May 1, 2014

Related U.S. Application Data

(63) Continuation-in-part of application No. 13/283,404, filed on Oct. 27, 2010, now abandoned.

(60) Provisional application No. 61/716,082, filed on Oct. 19, 2012.

(51) Int. Cl.
*B01J 23/88* (2006.01)
*B01J 23/883* (2006.01)
(Continued)

(52) U.S. Cl.
CPC .............. *B01J 23/883* (2013.01); *B01J 35/002* (2013.01); *B01J 35/1042* (2013.01);
(Continued)

(58) Field of Classification Search
CPC ............ B01J 27/19; B01J 23/76; B01J 23/84; B01J 23/85; B01J 23/88; B01J 23/883; B01J 27/04; B01J 27/043; B01J 27/049; C10L 1/04; C10G 29/04
USPC .................................. 502/305, 315, 326, 337
See application file for complete search history.

(56) References Cited

U.S. PATENT DOCUMENTS

| 4,485,008 A | 11/1984 | Maa et al. |
| 4,738,944 A | 4/1988 | Robinson et al. |

(Continued)

FOREIGN PATENT DOCUMENTS

| EP | 0204354 | 12/1986 |
| EP | 0342759 | 11/1989 |

(Continued)

OTHER PUBLICATIONS

International Search Report for PCT/US2011/066223 dated Jan. 17, 2013; 7 pages.

(Continued)

*Primary Examiner* — Brian McCaig
(74) *Attorney, Agent, or Firm* — Charles W. Stewart

(57) ABSTRACT

A self activating catalyst for treating heavy hydrocarbon feedstocks that comprises a calcined particle comprising a co-mulled mixture made by co-mulling inorganic oxide powder, molybdenum trioxide powder, and a nickel compound and then forming the co-mulled mixture into a particle that is calcined to thereby provide the calcined particle. The calcined particle comprises from 1 to 10 weight percent molybdenum and nickel that is present in an amount such that the weight ratio of said nickel-to-molybdenum is less than 0.4. The calcined particle has a pore size distribution that contributes to the unique properties of the catalyst. The calcined particle and catalyst also exhibits a unique Raman spectrum. The self activating catalyst is activated when contacted under suitable process conditions with a heavy residue feedstock having high nickel, vanadium and sulfur concentrations.

27 Claims, 2 Drawing Sheets

Figure 1:
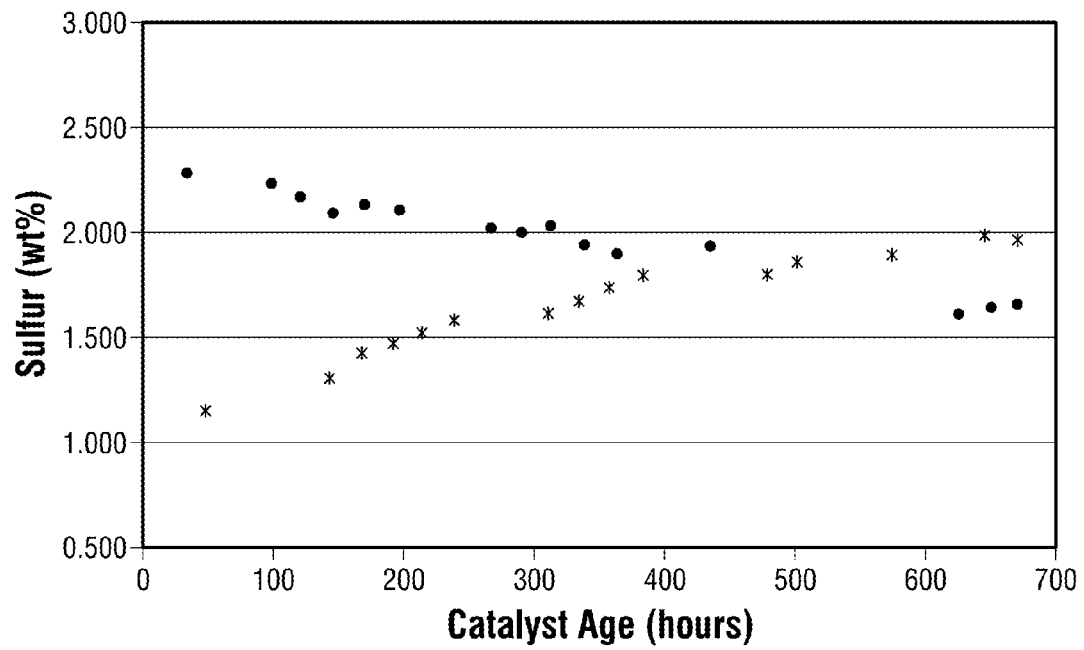

(51) Int. Cl.

| | | |
|---|---|---|
| *C10G 45/08* | (2006.01) | |
| *B01J 37/04* | (2006.01) | |
| *B01J 37/28* | (2006.01) | |
| *B01J 35/00* | (2006.01) | |
| *B01J 35/10* | (2006.01) | |
| *B01J 37/02* | (2006.01) | |
| B01J 23/76 | (2006.01) | |
| B01J 23/84 | (2006.01) | |
| B01J 23/85 | (2006.01) | |

(52) U.S. Cl.
CPC ......... *B01J 35/1061* (2013.01); *B01J 37/0201* (2013.01); *B01J 37/04* (2013.01); *B01J 37/28* (2013.01); *C10G 45/08* (2013.01); *C10G 2300/202* (2013.01); *C10G 2300/205* (2013.01)

(56) References Cited

U.S. PATENT DOCUMENTS

| | | |
|---|---|---|
| 4,906,357 A | 3/1990 | Drori |
| 7,708,058 B1 | 5/2010 | Gipson |
| 7,824,541 B2 | 11/2010 | Bhan |
| 7,871,513 B1 | 1/2011 | Bhan |
| 2008/0050792 A1 | 2/2008 | Zmierczak et al. |
| 2008/0308280 A1 | 12/2008 | Head |
| 2009/0056953 A1 | 3/2009 | Korach et al. |
| 2009/0255850 A1* | 10/2009 | Bhan et al. ............. 208/15 |
| 2010/0000908 A1 | 1/2010 | Markkanen et al. |
| 2010/0017496 A1 | 1/2010 | Kimmel et al. |
| 2010/0025823 A1 | 2/2010 | Collazo et al. |
| 2010/0126727 A1 | 5/2010 | Vinegar et al. |
| 2010/0326888 A1 | 12/2010 | Xu et al. |
| 2011/0068047 A1 | 3/2011 | Gudde et al. |
| 2011/0073523 A1 | 3/2011 | Cui et al. |
| 2011/0210045 A1 | 9/2011 | Kou et al. |

FOREIGN PATENT DOCUMENTS

| | | |
|---|---|---|
| EP | 2182047 | 5/2010 |
| WO | 0011112 | 3/2000 |
| WO | 2006029456 | 3/2006 |
| WO | 2010000908 | 1/2010 |
| WO | 2010111168 | 9/2010 |
| WO | 2010121367 | 10/2010 |
| WO | 2013063219 | 5/2013 |
| WO | 2013163126 | 10/2013 |

OTHER PUBLICATIONS

Van Der Drift et al.; "Entrained Flow Gasification of Biomass-Ash Behavior, Feeding Issues and System Analysis"; Retrieved from URL:http://www.ecn.nl/docs/library/report/2004/c04039.pdf.

* cited by examiner

SELF-ACTIVATING HYDROPROCESSING CATALYST AND PROCESS FOR TREATING HEAVY HYDROCARBON FEEDSTOCKS

The present application claims the benefit of U.S. Provisional Patent Application Ser. No. 61/716,082, filed Oct. 19, 2012, and U.S. patent application Ser. Nos. 13/283,389 and 13/283,404, both filed Oct. 27, 2012, which applications are incorporated herein by reference in their entirety.

This invention relates to a hydroprocessing catalyst and a hydrotreating process for the treatment of heavy hydrocarbon feedstocks.

In the refining of crude oils the heavy cuts including residue often are subjected to catalytic hydroprocessing to remove such components as sulfur, nitrogen, metals, and Conradson carbon through desulfurization, denitrogenation, demetallization, or asphaltene conversion or any combination thereof. Various types of heterogeneous hydroprocessing catalysts are used to promote these reactions by contacting the catalyst with feedstock under conditions of elevated temperature and pressure and in the presence of hydrogen.

One catalyst that has been found to be useful in the hydroprocessing of high boiling hydrocarbon feedstocks is disclosed in U.S. Pat. No. 4,738,944 (Robinson et al.). The catalyst disclosed in this patent contains nickel, phosphorus and molybdenum supported on alumina, and it contains up to about 10, usually from 1 to 8 percent, and preferably from 2 to 6 percent weight of nickel metal components, calculated as the monoxide. The catalyst also contains from about 16 to about 23 and preferably from 19 to 21.5 percent by weight molybdenum metal components, calculated as molybdenum trioxide ($MoO_3$). The pore structure of the catalyst is such that it has a narrow pore size distribution with at least about 75 percent, preferably at least about 80 percent, and most preferably at least about 85 percent of the total pore volume in pores of diameter from about 50 to about 110 angstroms. Ordinarily the catalyst has less than about 10 percent of its total pore volume in pores of diameter below about 50 angstroms.

Another hydroprocessing catalyst is disclosed in U.S. Pat. No. 7,824,541 (Bhan) that is particularly useful in the treatment of distillate feedstocks to manufacture low-sulfur distillate products. This catalyst is a co-mulled mixture of molybdenum trioxide, a Group VIII metal compound, and an inorganic oxide material. The co-mulled mixture is calcined. The molybdenum content of the catalyst is in the range of from 10.5 to 33 wt. %, calculated as an oxide. If the Group VIII metal component is nickel, it is present in the catalyst in the range of from 3.8 to 15.3 wt. %, calculated as an oxide. The catalyst also has a mean pore diameter that is in a specific and narrow range of from 50 to 100 angstroms. There is less than 4.5 percent of the total pore volume that is contained in its macropores having pore diameters greater than 350 angstroms and less than 1 percent of the total pore volume contained in its macropores having pore diameters greater than 1000 angstroms.

Disclosed in U.S. Pat. No. 7,871,513 (Bhan) is a catalyst that is useful in the hydroprocessing of heavy hydrocarbon feedstocks. This catalyst is a calcined mixture made by calcining a formed particle of a mixture comprising molybdenum trioxide, a nickel compound, and an inorganic oxide material. The molybdenum content of the catalyst is in the range upwardly to 18 wt. %, calculated as an oxide. The nickel content of the catalyst is in the range upwardly to 5.1 wt. %, calculated as an oxide. The molybdenum source used in the preparation of the catalyst is in the form of molybdenum trioxide that is in a finely divided state.

While the aforementioned catalysts have been shown to have good hydroprocessing activity, there are continuing efforts to find new or improved catalyst compositions having increased catalytic activity or improved stability, or both. Any improvement in catalyst activity can result in the lowering of required reactor temperatures in order to obtain a product of a given nitrogen, sulfur, asphaltene, or metal content from a feedstock that is contaminated with these components. The lower reactor temperatures provide for energy savings and will extend the life of a catalyst. There also are ongoing efforts to find more economical methods of manufacturing the catalyst compositions.

Heavy hydrocarbon feedstocks such as vacuum tower bottoms and resids are typically more difficult to hydrotreat to remove such components as sulfur, nitrogen, metals and carbon than the lighter distillate and naphtha feedstocks. Specially designed catalysts that are different from those used for treating the lighter hydrocarbon feedstocks can be required in order to more economically treat the heavier hydrocarbon feedstocks. So, there is an ongoing need to find new or improve catalyst compositions that have good properties for the hydroprocessing of heavy hydrocarbon feedstocks.

It is, therefore, desirable to provide an improved hydroprocessing catalyst having good catalytic activity and stability and which can be economical to manufacture. One particular desire is to provide a hydroprocessing catalyst that is particularly useful in the hydroprocessing of heavy hydrocarbon feedstocks, and, especially such feedstocks that have exceptionally high sulfur and metals concentrations.

Thus, accordingly, provided is a self-activating hydroprocessing catalyst for treating heavy hydrocarbon feedstocks. The catalyst comprises a calcined particle comprising a co-mulled mixture made by co-mulling inorganic oxide powder, molybdenum trioxide powder, and a nickel compound and then forming the co-mulled mixture into a particle that is calcined to thereby provide the calcined particle. The calcined particle comprises molybdenum that is present in an amount in the range of from 1 to 10 weight percent, as metal and based on the total weight of the calcined particle, and nickel that is present in an amount such that the weight ratio of nickel-to-molybdenum is less than 0.4. The calcined particle further has a pore size distribution such that less than 70% of the total pore volume of the calcined particle is in its pores having a diameter in the range of from 70 Å to 150 Å, and at least 10% of the total pore volume of the calcined particle is in its pores having a diameter in the range of from 130 Å to 300 Å, and from 1% to 10% of the total pore volume of the calcined particle is in its pores having a diameter greater than 1000 Å. The calcined particle exhibits a spectrum having a characteristic Raman peak within the Raman region of from 546 $cm^{-1}$ to 586 $cm^{-1}$, or a peak in the region of from 828 $cm^{-1}$ to 868 $cm^{-1}$, or a peak within the region of from 879 $cm^{-1}$ to 919 $cm^{-1}$ or at least one Raman peak within any two or more of the aforementioned three recited Raman regions.

Another embodiment of the invention includes a process comprising: contacting, under process conditions suitable for providing for the self activation of a self activating catalyst, a heavy hydrocarbon feedstock having a nickel content in the range of from 2 ppmw to 150 ppmw, a vanadium content in the range of from 5 ppmw to 250 ppmw, and a sulfur content in the range of from 0.3 wt % to 8 wt % with the self activating catalyst. The self activating catalyst comprises a calcined particle comprising a co-mulled mixture made by co-mulling inorganic oxide powder, molybdenum trioxide powder, and a nickel compound and then forming the co-mulled mixture into a particle that is calcined to thereby provide the calcined particle. The calcined particle comprises molybdenum that is present in an amount in the range of from 1 to 10 weight percent, as metal and based on the total weight of the calcined particle, and nickel that is present in an amount such that the weight ratio of nickel-to-molybdenum is less than 0.4. The calcined particle further has a pore size distribution such that less than 70% of the total pore volume of the calcined particle is in its pores having a diameter in the range of from 70 Å to 150 Å, and at least 10% of the total pore volume of the calcined particle is in its pores having a diameter in the range of from 130 Å to 300 Å, and from 1% to 10% of the total pore volume of the calcined particle is in its pores having a diameter greater than 1000 Å. The calcined particle exhibits a spectrum having a characteristic Raman peak within the Raman region of from 546 $cm^{-1}$ to 586 $cm^{-1}$, or a peak within the region of from 828 $cm^{-1}$ to 868 $cm^{-1}$, or a peak in the region of from 879 $cm^{-1}$ to 919 $cm^{-1}$ or at least one Raman peak within any two or more of the aforementioned three recited Raman regions.

FIG. 1 presents plots of the weight percent of sulfur in reactor product liquid as a function of catalyst age for an embodiment of the inventive catalyst and for two comparison catalysts with the rate constants being determined from the use of the catalysts in an experimental hydrodesulfurization of a residue feedstock.

Figure 2:
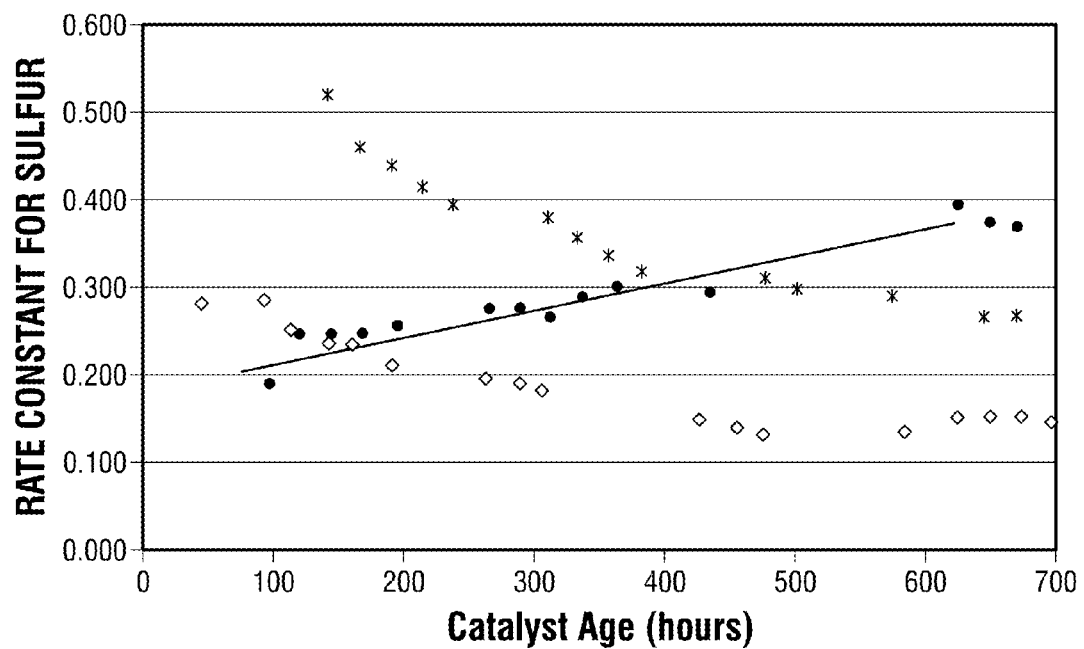

FIG. 2 presents plots of the hydrodesulfurization (HDS) activity as a function of catalyst age for an embodiment of the inventive catalyst and for a comparison catalyst with the rate constants being determined from the use of the catalysts in an experimental hydrodesulfurization of a residue feedstock.

Figure 3:
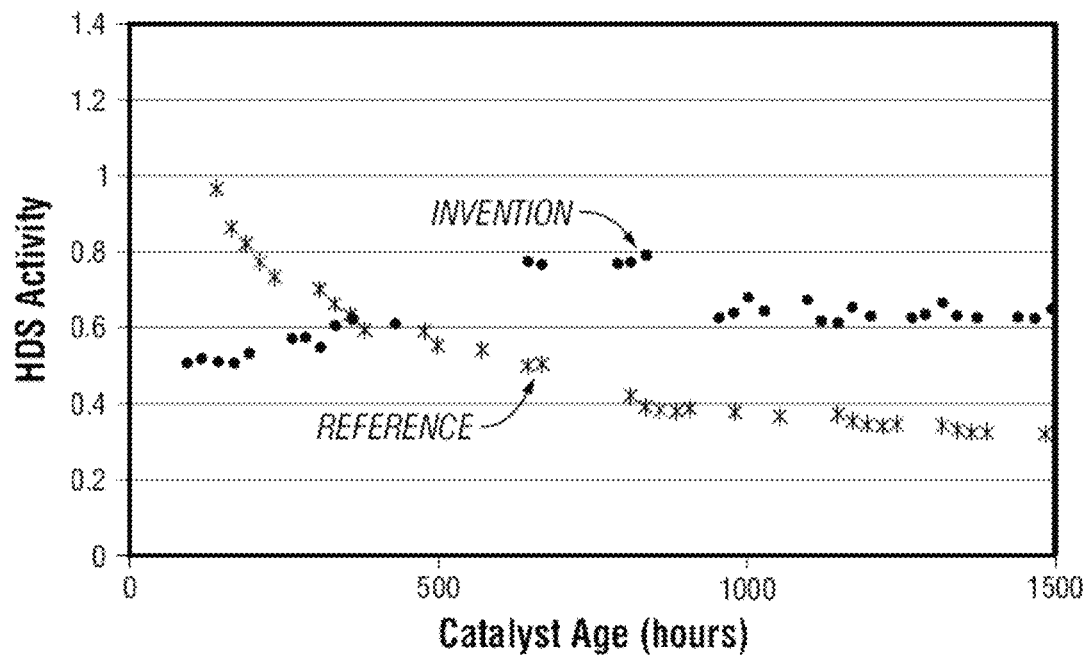

FIG. 3 presents comparison plots of the stabilized desulfurization rate constant as a function of catalyst age of the liquid product resulting from an experimental hydrodesulfurization of a residue feedstock using an embodiment of the inventive catalyst and a comparison catalyst.

Figure 4:
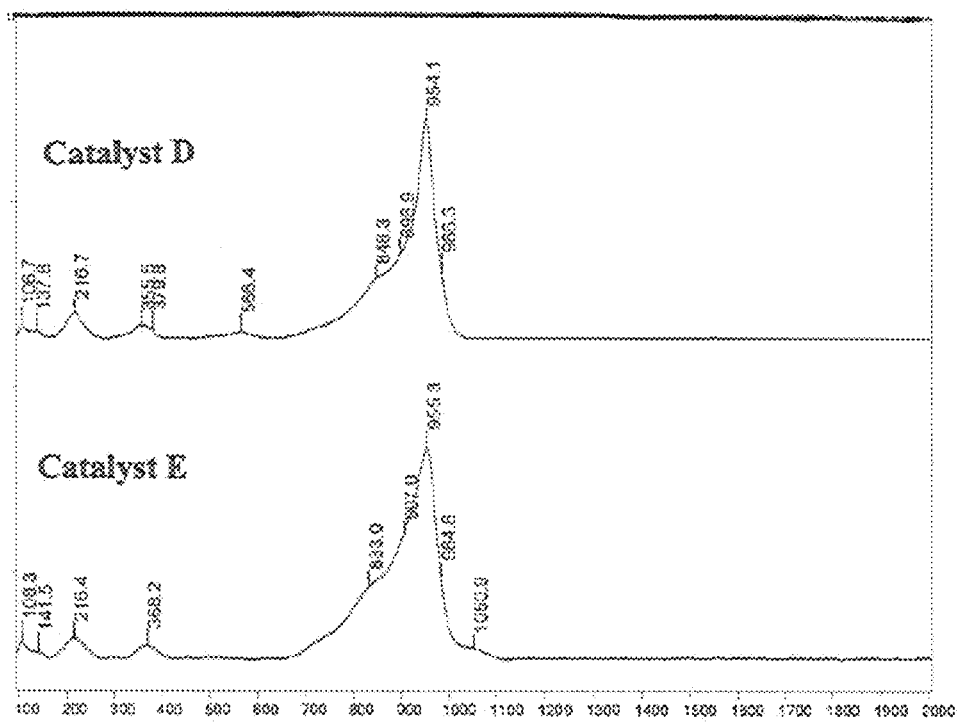

FIG. 4 presents the Raman spectrum of the inventive catalyst D and the Raman spectrum of comparative catalysts E. The Raman frequencies are scaled on the abscissa (x-coordinate) in the range of from approximately 100 $cm^{-1}$ to approximately 2100 $cm^{-1}$ A novel catalyst composition has been discovered that is especially useful in the hydrotreatment of heavy hydrocarbon feedstocks that have significant concentrations of sulfur, nitrogen, metals such as vanadium and nickel, and Conradson carbon. This catalyst is particularly unique in that it exhibits certain self activation properties, which prior art catalysts seem to not exhibit, when it is used in the treatment of hydrocarbon feedstocks. One of the unexpected properties of the novel catalyst is that its activity increases with use. The activity of prior art catalysts, on the other hand, tends to decrease with use. The inventive process utilizes the novel composition, which has a unique pore structure and a relatively low concentration of molybdenum and a particularly low concentration of nickel such that when it is used in the treatment of a heavy hydrocarbon feedstock that has a concentration of nickel, under suitable process conditions and in the presence of hydrogen, the catalytic activity of the composition increases with usage or age.

The inventive composition comprises a calcined particle that comprises a co-mulled mixture of inorganic oxide powder, molybdenum trioxide powder, and a nickel compound, wherein the co-mulled mixture has been formed into a particle that is calcined to thereby provide the calcined particle. The calcined particle further has a specifically defined pore size distribution as described elsewhere herein. The calcined particle may itself be used as the self-activating hydroprocessing catalyst of the invention or it may be used as a component thereof.

The amounts of molybdenum and nickel used to prepare the co-mulled mixture, which is formed to provide the particle that is calcined, are relatively low when compared to the concentration amounts for these metals that are typically used in the prior art hydroprocessing catalysts. And, indeed, one of the features of the inventive composition and process is that the amounts and concentrations of active metals in the catalyst composition of the invention are especially low, but they provide, in combination with other of the specifically defined physical properties of the composition, for a catalyst that is self activating when it is used in the hydroprocessing of a heavy feedstock having a concentration of nickel that is typically in the form of an organic nickel compound but the nickel may be in other forms as well.

The calcined particle of the invention comprises molybdenum and nickel at concentrations that are relatively low when compared to the concentration of such metals in many of the prior art hydrotreating catalysts. But, the concentrations of these metals are important features of the invention and when used in combination with the specifically defined pore structure of the inventive composition the combination provides for its unique self activation characteristics. Thus, the calcined particle generally comprises, consists essentially of, or consists of an inorganic oxide, molybdenum, and nickel, wherein the molybdenum content of the calcined particle is in the range of from 1 to 10 weight percent (wt. %) of the total weight of the calcined particle, calculated as metal, regardless of its actual form, or, in other words, of from 1.5 wt. % to 15 wt. % molybdenum trioxide ($MoO_3$).

It is desirable for the molybdenum to be present in the calcined particle in an amount that is less than 9.5 wt. % (i.e., 14.25 wt. %, calculated as $MoO_3$) and at least 1.5 wt. % (i.e., 2.25 wt. %, calculated as $MoO_3$). In a preferred embodiment, the concentration of molybdenum in the calcined particle is in the range of from 2 wt. % to 9 wt. % (i.e., from 3 wt. % to 13.5 wt. %, calculated as $MoO_3$), and, in a more preferred embodiment, the concentration is in the range of from 2.5 wt. % to 8.5 wt. % (i.e., 3.75 wt. % to 12.75 wt. %, calculated as $MoO_3$). A most preferred concentration range of molybdenum in the calcined particle of the invention is from 3 wt. % to 8 wt. % (i.e., 4.5 wt. % to 12 wt. %, calculated as $MoO_3$).

An important aspect of the invention is that the calcined particle is to have a particularly low concentration of nickel but not too much nickel such that the self activation properties of the composition are not realized. While not wishing to be bound to any particular theory, it is anyway theorized that the unique properties of the inventive composition allow for the sorption or uptake of nickel from a heavy hydrocarbon feedstock, having a concentration of nickel, when it is contacted with the composition under suitable process conditions. As the nickel is deposited upon or sorbed by the catalyst or calcined particle the activity of the catalyst improves due to the additionally incorporated nickel. The small amount of nickel initially contained in the calcined particle is thought to necessarily be present in order to promote desulfurization activity so as to yield hydrogen sulfide that reacts with the nickel that is present in the feedstock. The resulting nickel sulfide is thought to then migrate to the nickel sites that are initially present in the catalyst.

It is, thus, desirable for the calcined particle to have a low concentration of nickel in an amount such that the weight ratio of nickel-to-molybdenum in the calcined particle is at least or greater than 0.01:1. It is further desirable for the weight ratio of nickel-to-molybdenum in the calcined particle to be less than 0.4:1. Generally, the weight ratio of nickel-to-molybdenum in the calcined particle is to be in the range of from 0.01:1 to 0.35:1. It is preferred for the weight ratio of nickel-to-molybdenum of the calcined particle to be in the range of from 0.01:1 to 0.3:1. The weight ratio is calculated and presented on an elemental basis.

In another embodiment of the inventive composition it may be desirable for the calcined particle to have a low concentration of nickel in an amount such that the atomic ratio of nickel-to-molybdenum in the calcined particle is at least or greater than 0.01:1. It further can be desirable for the atomic ratio of nickel-to-molybdenum in the calcined particle to be less than 0.4:1. Generally, the atomic ratio of nickel-to-molybdenum in the calcined particle of this embodiment is in the range of from 0.01:1 to 0.35:1, and, preferably, within this range, the atomic ratio of nickel-to-molybdenum of the calcined particle is to be in the range of from 0.01:1 to 0.3:1.

The amount of inorganic oxide of the calcined particle may be in the range upwardly to about 98 weight percent of the calcined particle. Typically, the inorganic oxide of the calcined particle is present in an amount in the range of from 70 to 98 weight percent, and, preferably, from 75 to 98 weight percent of the calcined particle.

It further may be desirable for the calcined particle to have a material absence of cobalt. While it is not known with any certainty, it is thought that the presence of a material amount of cobalt in the calcined particle may negatively affect the self activation properties of the composition and, therefore, an amount of cobalt that might adversely impact the self activation properties of the calcined particle when it is used in the hydroprocessing of a heavy hydrocarbon feedstock having a concentration of nickel should not be present in the calcined particle.

What is meant herein by the phrase "a material absence of cobalt" is that the composition contains, if any, cobalt at such a concentration that it does not materially affect the self activation attributes of the calcined particle when it is used in the hydrotreating, e.g., hydrodesulfurization, of a heavy feedstock having a concentration of nickel. The heavy feedstock and nickel concentrations are defined in detail elsewhere herein.

The material absence of cobalt typically will mean that the calcined particle can comprise less than 0.1 weight percent (wt. %) cobalt, calculated as metal and based on the total weight of the calcined particle, regardless of the actual form of the cobalt. Preferably, the cobalt is present in the calcined particle at a concentration of less than 0.075 weight percent and, more preferably, less than 0.05 wt. %. The calcined particle may also have a substantial absence of cobalt.

An important feature of the inventive composition is its specific pore structure. The combination of a specific pore structure, as defined herein, and a relatively low concentration of nickel is believed to provide for the unique and unexpected self activation characteristics of the calcined particle when it is used to hydrotreat hydrocarbon feedstocks, and, in particular, heavy hydrocarbon feedstocks having concentrations of nickel. It is thought that the presence of a material, but not too large of, percentage of the total pore volume of the calcined particle being present in the macropores of greater than 1000 Å along with a relatively large proportion of the total pore volume being present in the moderate size mesopores in the range of from 70 Å to 150 Å provide the right structure that contributes to the mechanism described above and allows for the migration and transportation of nickel into suitable spots within the pores of the composition.

It is also important that the pore structure of the calcined particle have at least 1 percent (%) of its total pore volume to be contained in its pores having a diameter greater than 1000 Å. Also, the calcined particle is to have less than 10% of its total pore volume that is contained in the pores having a diameter greater than 1000 Å. It is preferred that from 2% to 10% of the total pore volume of the calcined particle to be present in its pores having a diameter of greater than 1000 Å, and, more preferred, from 3% to 9% of the total pore volume of the calcined particle is in the pores of diameter greater than 1000 Å.

Concerning the moderate size mesopores of the calcined particle, at least 40% but less than 70% of the total pore volume of the calcined particle is in its pores having a diameter in the range of from 70 Å to 150 Å. Preferably, from 50% to 70% of the total pore volume of the calcined particle is in its pores having a diameter in the range of from 70 Å to 150 Å.

It further is desirable for at least 10% of the total pore volume of the calcined particle to be present in its pores having a diameter in the range of from 130 Å to 300 Å. Preferably, at least 15%, and, more preferably, at least 20% of the total pore volume of the calcined particle is in the pores having a diameter in the range of from 130 Å to 300 Å.

The catalyst composition of the invention further exhibits Raman spectral characteristics that distinguish it over prior art catalysts, and that suggests the molybdenum component is present in the inventive catalyst in a form which is different from that of the molybdenum in prior art catalysts. In particular, it is believed that certain of the Raman bands exhibited by the inventive catalyst composition indicate the molybdenum to be predominantly or substantially present in the form of octahedrally coordinated molybdenum.

The inventive catalyst is distinguishable over other catalysts in that it is characterized by a Raman spectrum having a Raman peak within the overall Raman region of from about 546 $cm^{-1}$ to about 586 $cm^{-1}$, e.g., at approximately 566 $cm^{-1}$. This peak is preferably within the Raman region of from 556 $cm^{-1}$ to 576 $cm^{-1}$, more preferably, from 561 $cm^{-1}$ to 571 $cm^{-1}$, and, most preferably, from 562 $cm^{-1}$ to 570 $cm^{-1}$.

The inventive catalyst may further be characterized as expressing a Raman spectrum that includes a Raman peak within a Raman region that includes the range of from 828 $cm^{-1}$ to 868 $cm^{-1}$, e.g., at approximately 848 $cm^{-1}$ It is preferred for this peak to be within the Raman region of from 838 $cm^{-1}$ to 858 $cm^{-1}$, and, more preferred, from 843 $cm^{-1}$ to 853 $cm^{-1}$. An especially preferred range for this Raman region is from 845 $cm^{-1}$ to 851 $cm^{-1}$.

The inventive catalyst may also further be characterized by having a Raman spectrum that includes a Raman peak within a Raman region that includes the range of from 879 $cm^{-1}$ to 919 $cm^{-1}$, e.g., at approximately 899 $cm^{-1}$. It is preferred for this peak to be within the Raman region of from 889 $cm^{-1}$ to 909 $cm^{-1}$, and, more preferred, from 894 $cm^{-1}$ to 904 $cm^{-1}$. As especially preferred range for this Raman region if from 896 $cm^{-1}$ to 901 $cm^1$.

The inventive catalyst may also exhibit characteristic Raman peaks within one or more of the aforementioned Raman regions. An example of this is that a Raman peak may be within the range of from 546 $cm^{-1}$ to 586 $cm^{-1}$, or within any of the narrower ranges described above within this broader range, and/or a Raman peak may be within the range of from 828 $cm^{-1}$ to 868 $cm^{-1}$, or within any of the narrower ranges described above within this broader range, and/or a Raman peak may be within the range of from 879 $cm^{-1}$ to 919 $cm^{-1}$, or within any of the narrower ranges described above within this broader range. Thus, at least one Raman peak may be expressed within one or more of the aforementioned recited ranges for the Raman regions, or at least one Raman peak may be expressed within each of any two or more of the aforementioned recited Raman regions.

It is noted that the frequencies of the Raman spectrum mentioned above are given as Raman shifts abbreviated as cm$^{-1}$, thus, they are actually differential values between an excitation wavelength and a detected wavelength.

The Raman spectrum is to be as measured using a conventional laboratory Raman spectrometer (such as a Chromex Sentinel II fiber optic Raman spectrometer, or any other suitable Raman spectrometer than will provide substantially the same test results) under the conditions that include: an excitation wavelength of 785 nanometers with 40 mw at the sample. The Raman spectrometer should be capable of a spectral resolution of less than 2 nm/mm.

In preparing the calcined particle of the invention the starting materials are mixed, preferably by co-mulling, to form a co-mulled mixture. The essential starting materials in the preparation of the co-mulled mixture include molybdenum trioxide that is preferably in the form of finely divided particles that may be as a dry powder or as particles in a suspension or slurry, a nickel component, and an inorganic oxide material. The inorganic oxide material may be selected from the group consisting of alumina, silica and alumina-silica.

The nickel component may be selected from a group of any suitable nickel compounds that are capable of being mixed with the other components of the co-mulled mixture and to be shaped into a particle that is to be calcined to form the calcined particle of the invention. The nickel component may be nickel in an oxide form, such as nickel oxide, or it may be a nickel salt compound. Nickel oxide compounds that may suitably be used include, for example, hydroxides, nitrates, acetates, and oxides of nickel. One preferred nickel compound that may be used in the preparation of the co-mulled mixture is nickel nitrate.

The formation of the co-mulled mixture may be done by any method or means known to those skilled in the art, including, but not limited to, the use of such suitable types of solids-mixing machines as tumblers, stationary shells or troughs, muller mixers, which are either batch type or continuous type, and impact mixers, and the use of such suitable types of either batch-wise or continuous mixers for mixing solids and liquids or for the formation of paste-like mixtures that are extrudable. Suitable types of batch mixers include, but are not limited to, change-can mixers, stationary-tank mixers, double-arm kneading mixers that are equipped with any suitable type of mixing blade. Suitable types of continuous mixers include, but are not limited to, single or double screw extruders, trough-and-screw mixers and pug mills.

The mixing of starting materials of the calcined particle may be conducted for any suitable time period necessary to properly homogenize the co-mulled mixture. Generally, the blending time may be in the range of upwardly to 2 or more than 3 hours. Typically, the blending time is in the range of from 0.1 hours to 3 hours.

The term "co-mulling" is used broadly in this specification to mean that at least the recited starting materials are mixed together to form a mixture of the individual components of the co-mulled mixture that is preferably a substantially uniform or homogeneous mixture of the individual components of such co-mulled mixture. This term is intended to be broad enough in scope to include the mixing of the starting materials so as to yield a paste that exhibits properties making it capable of being extruded or formed into extrudate particles by any of the known extrusion methods. But, also, the term is intended to encompass the mixing of the starting materials so as to yield a mixture that is preferably substantially homogeneous and capable of being agglomerated into formed particles, such as, spheroids, pills or tablets, cylinders, irregular extrusions or merely loosely bound aggregates or clusters, by any of the methods known to those skilled in the art, including, but not limited to, molding, tableting, pressing, pelletizing, extruding, and tumbling.

As already noted, it is an important aspect of the inventive method for at least a major portion of the molybdenum source of the calcined particle to be predominantly molybdenum trioxide. In the mixing or co-mulling of the starting materials of the calcined particle, it is preferred for the molybdenum trioxide to be in a finely divided state either as a finely powdered solid or as fine particles in a suspension or slurry. It is best for the particle sizes of the particulate molybdenum trioxide used in the manufacture of the catalyst to have a maximum dimension of less than 0.5 mm (500 microns, μm), preferably, a maximum dimension of less than 0.15 mm (150 μm), more preferably, less than 0.1 mm (100 μm), and, most preferably, less than 0.075 mm (75 μm).

While it is not known with certainty, it is believed that it is advantageous to the invention for the molybdenum trioxide that is used in the manufacture of the inventive calcined particle to be in the form of as small particles as is practically possible; so, therefore, it is not desired to have a lower limit on the size of the molybdenum trioxide particles used in the manufacture of the calcined particle. However, it is understood that the particle size of the molybdenum trioxide used in the manufacture of the calcined particle will generally have a lower limit to its size of greater than 0.2 microns. Thus, the particle size of the molybdenum trioxide used in the formation of the co-mulled mixture in the manufacture of the inventive calcined particle is preferably in the range of from 0.2 to 150 μm, more preferably, from 0.3 to 100 μm, and, most preferably, from 0.5 to 75 μm. Typically, the size distribution of the molybdenum trioxide particles, whether in a dry powder or a suspension or otherwise, is such that at least 50 percent of the particles have a maximum dimension in the range of from 2 to 15 μm.

Once the starting materials of the calcined particle are properly mixed and formed into the shaped or formed particles, a drying step may advantageously be used for removing certain quantities of water or volatiles that are included within the co-mulled mixture or formed particles. The drying of the formed particles may be conducted at any suitable temperature for removing excess water or volatiles, but, preferably, the drying temperature will be in the range of from about 75° C. to 250° C. The time period for drying the particles is any suitable period of time necessary to provide for the desired amount of reduction in the volatile content of the particles prior to the calcination step.

The dried or undried particles are calcined in the presence of an oxygen-containing fluid, such as air, at a temperature that is suitable for achieving a desired degree of calcination. Generally, the calcination temperature is in the range of from 450° C. (842° F.) to 900° C. (1652° F.). The temperature conditions at which the particles are calcined can be important to the control of the pore structure of the calcined particle. Due to the presence of the molybdenum trioxide in the formed particles, the calcination temperature required to provide for a calcined particle having the required pore structure is higher than typical temperatures required to calcine other compositions containing inorganic oxide materials, especially those that do not contain molybdenum trioxide. But, in any event, the temperature at which the formed particles are calcined to provide the calcined particle is controlled so as to provide the calcined particle having the pore structure properties as described in detail herein. The preferred calcination temperature is in the range of from 510° C. (950° F.) to 820° C. (1508° F.), and, most preferably, from 700° C. (1292° F.) to 790° C. (1454° F.).

The calcined particle is particularly useful as a high activity hydroprocessing catalyst for use in the hydroprocessing of a heavy feedstock stream that has high contents of pitch, organic metals such as nickel and vanadium compounds, and sulfur. Prior to its use, the calcined particle may, but is not required to, be sulfided or activated by any of the methods known to those skilled in the art. Generally, in its use in the hydroprocessing of a hydrocarbon feedstock, the calcined particle is contained within a reaction zone, such as that which is defined by a reactor vessel, wherein a hydrocarbon feedstock is contacted with the calcined particle under suitable hydroprocessing reaction conditions and from which a treated hydrocarbon product is yielded.

The preferred hydrocarbon feedstock of the inventive process is a heavy hydrocarbon feedstock. The heavy hydrocarbon feedstock may be derived from any of the high boiling temperature petroleum cuts such as atmospheric tower gas oils, atmospheric tower bottoms, vacuum tower gas oils, and vacuum tower bottoms or resid. It is a particularly useful aspect of the inventive process to provide for the hydroprocessing of a heavy hydrocarbon feedstock that can be generally defined as having a boiling temperature at its 5% distillation point, i.e. T(5), that exceeds 300° C. (572° F.) as determined by using the testing procedure set forth in ASTM D-1160. The invention is more particularly directed to the hydroprocessing of a heavy hydrocarbon feedstock having a T(5) that exceeds 315° C. (599° F.) and, even, one that exceeds 340° C. (644° F.).

The heavy hydrocarbon feedstock further may include heavier hydrocarbons that have boiling temperatures above 538° C. (1000° F.). These heavier hydrocarbons are referred to herein as pitch, and, as already noted, it is recognized that one of the special features of the inventive catalyst or process is that it is particularly effective in the hydroconversion of the pitch content of a heavy hydrocarbon feedstock. The heavy hydrocarbon feedstock may include as little as 10 volume percent pitch or as much as 90 volume percent pitch, but, generally, the amount of pitch included in the heavy hydrocarbon feedstock is in the range of from 20 to 80 volume percent. And, more typically, the pitch content in the heavy hydrocarbon feedstock is in the range of from 30 to 75 volume percent.

The heavy hydrocarbon feedstock further may include a significantly high sulfur content. One of the special features of the invention is that it provides for the desulfurization and demetallization of the heavy hydrocarbon feedstock. The sulfur content of the heavy hydrocarbon feedstock is primarily in the form of organic sulfur-containing compounds, which may include, for example, mercaptans, substituted or unsubstituted thiophenes, heterocyclic compounds, or any other type of sulfur-containing compound.

A feature of the invention is that it provides for the desulfurization of the heavy feedstock that has a significantly high sulfur content, such as a sulfur content that is typically much greater than 1 weight percent, so as to provide for a treated hydrocarbon product having a reduced sulfur content, such as a sulfur content of less than 1 weight percent, preferably, less than 0.75 wt. %, and, more preferably, less than 0.5 wt. %.

When referring herein to the sulfur content of either the heavy hydrocarbon feedstock or the treated hydrocarbon product, the weight percents are determined by the use of testing method ASTM D-4294.

The inventive process is particularly useful in the processing of a heavy hydrocarbon feedstock that has a sulfur content exceeding 2 weight percent, and with such a heavy hydrocarbon feedstock, the sulfur content may be in the range of from 2 to 8 weight percent. The inventive catalyst and process are especially useful in the processing of a heavy hydrocarbon feedstock having an especially high sulfur content of exceeding 3 or even 4 weight percent and being in the range of from 3 to 7 weight percent or even from 4 to 6.5 weight percent.

The inventive process utilizes the inventive calcined particle as a catalyst in the hydroprocessing of the heavy hydrocarbon feedstock to provide for the simultaneous desulfurization, denitrogenation, conversion of Microcarbon residue, and removal of vanadium and nickel. In this process, the heavy hydrocarbon feedstock is contacted with the inventive catalyst under suitable hydrodesulfurization and hydroconversion process conditions and the treated hydrocarbon product is yielded.

One embodiment of the inventive process is the processing of a heavy hydrocarbon feedstock that has a significant concentration of nickel, and, as noted above, a significant feature of this embodiment of the inventive process is the use of the inventive calcined particle with its unique physical characteristics and specific metals loading and relatively low nickel content in combination with the heavy hydrocarbon feedstock having a significant nickel content. It is believed that, with the use of the inventive composition and its low nickel content in the treatment of the nickel-containing heavy hydrocarbon feedstock, the activity of catalyst improves as the nickel from the heavy hydrocarbon feedstock is deposited upon or taken up by the catalyst.

The nickel content of the heavy hydrocarbon feedstock of the inventive process, thus, has a concentration of contaminant nickel that is typically in the form of organic nickel compounds. The nickel concentration of the heavy hydrocarbon feedstock typically can be in the range of from 2 ppmw to 250 ppmw. It is desirable for the hydrocarbon feedstock of the inventive process to have a concentration of nickel that is in the range of from 5 ppmw to 225 ppmw, and, it is more desirable for the nickel concentration to be in the range of from 7 ppmw to 200 ppmw.

The heavy hydrocarbon feedstock may also have a vanadium concentration that may typically be in the range of from 5 ppmw to 250 ppmw. It is desirable for the heavy hydrocarbon feedstock to contain as little vanadium as possible, but, the inventive composition provides for demetallization, and, thus, the removal of vanadium from the heavy hydrocarbon feedstock. More typically, the vanadium concentration of the heavy hydrocarbon feedstock is in the range of from 10 ppmw to 225 ppmw.

The treated hydrocarbon product should have a reduced sulfur content that is below that of the heavy hydrocarbon feedstock, such as a sulfur content of less than 1 weight percent. It is recognized that the inventive process, however, may have the capability of effectively desulfurizing the heavy hydrocarbon feedstock to provide the treated hydrocarbon product having a reduced sulfur content of less than 0.5 and even less than 0.4 weight percent based on the amount of catalyst used relative to feed volume.

The calcined particle (catalyst) of the invention may be employed as a part of any suitable reactor system that provides for the contacting of the catalyst with the heavy hydrocarbon feedstock under suitable hydroprocessing conditions that may include the presence of hydrogen and an elevated total pressure and temperature. Such suitable reaction systems can include fixed catalyst bed systems, ebullating catalyst bed systems, slurried catalyst systems, and fluidized catalyst bed systems. The preferred reactor system is that which includes a fixed bed of the inventive catalyst contained within a reactor vessel equipped with a reactor feed inlet means, such as a feed nozzle, for introducing the heavy hydrocarbon feedstock into the reactor vessel, and a reactor effluent outlet means, such as an effluent outlet nozzle, for withdrawing the reactor effluent or the treated hydrocarbon product from the reactor vessel.

The inventive process generally operates at a hydroprocessing (hydroconversion and hydrodesulfurization) reaction pressure in the range of from 2298 kPa (300 psig) to 20,684 kPa (3000 psig), preferably from 10,342 kPa (1500 psig) to 17,237 kPa (2500 psig), and, more preferably, from 12,411 kPa (1800 psig) to 15,513 kPa (2250 psig). The hydroprocessing reaction temperature is generally in the range of from 340° C. (644° F.) to 480° C. (896° F.), preferably, from 360° C. (680° F.) to 455° C. (851° F.), and, most preferably, from 380° C. (716° F.) to 425° C. (797° F.).

The flow rate at which the heavy hydrocarbon feedstock is charged to the reaction zone of the inventive process is generally such as to provide a liquid hourly space velocity (LHSV) in the range of from 0.01 $hr^{-1}$ to 3 $hr^{-1}$. The term "liquid hourly space velocity", as used herein, means the numerical ratio of the rate at which the heavy hydrocarbon feedstock is charged to the reaction zone of the inventive process in volume per hour divided by the volume of catalyst contained in the reaction zone to which the heavy hydrocarbon feedstock is charged. The preferred LHSV is in the range of from 0.05 $hr^{-1}$ to 2 $hr^{-1}$, more preferably, from 0.1 $hr^{-1}$ to 1.5 $hr^{-1}$ and, most preferably, from 0.2 $hr^{-1}$ to 0.7 $hr^{-1}$.

It is preferred to charge hydrogen along with the heavy hydrocarbon feedstock to the reaction zone of the inventive process. In this instance, the hydrogen is sometime referred to as hydrogen treat gas. The hydrogen treat gas rate is the amount of hydrogen relative to the amount of heavy hydrocarbon feedstock charged to the reaction zone and generally is in the range upwardly to 1781 $m^3/m^3$ (10,000 SCF/bbl). It is preferred for the treat gas rate to be in the range of from 89 $m^3/m^3$ (500 SCF/bbl) to 1781 $m^3/m^3$ (10,000 SCF/bbl), more preferably, from 178 $m^3/m^3$ (1,000 SCF/bbl) to 1602 $m^3/m^3$ (9,000 SCF/bbl), and, most preferably, from 356 $m^3/m^3$ (2,000 SCF/bbl) to 1425 $m^3/m^3$ (8,000 SCF/bbl).

The following examples are presented to further illustrate the invention, but they are not to be construed as limiting the scope of the invention.

EXAMPLE I

This Example I describes the preparation of Catalyst A, which is representative of one embodiment of the inventive catalyst.

Catalyst A

Catalyst A was prepared by first combining 2100 parts by weight alumina, containing nominal 2% silica, 63.17 parts by weight nickel nitrate (Ni(NO$_3$)$_2$) dissolved in 85.04 parts by weight deionized water by heating, 217.05 parts by weight molybdenum trioxide (MoO$_3$) powder, and 900 parts by weight crushed regenerated Ni/Mo/P hydrotreating catalyst within a Muller mixer along with 130 parts by weight 69.9% concentrated nitric acid and 30 grams of a commercial extrusion aid. A total of 3222.9 parts by weight of water was added to these components during the mixing. The components were mixed for approximately 30 minutes. The mixture had a pH of 4.12 and an LOI of 55.21 weight percent. The mixture was then extruded using 1.3 mm trilobe dies to form 1.3 trilobe extrudate particles. The extrudate particles were then dried in air for a period of several hours at a temperature of 100° C.

Aliquot portions of the dried extrudate particles were calcined in air each for a period of two hours at a temperature of 704° C. (1300° F.). The final calcined mixture contained 2.2 weight percent nickel metal (2.8 wt. % as NiO), and 7.9% molybdenum metal (11.9 wt. % as MoO$_3$) and 83.6 weight percent of alumina, containing nominal 2% silica, and 1.7% of phosphorus.

The following Table 1 presents certain properties of the dried and calcined extrudate particles. As may be seen from the pore properties of the calcined extrudate presented in Table 1 that the percentage of the total pore volume contained in the macropores having a pore diameter of greater than 1000 Angstroms (Å) is at least or greater than 1% but less than 10% percent. The percentage of the total pore volume that is contained in the pores having a pore diameter in the range of from 70-150 Å is at least or greater than 40% but less than 70%. And, the percentage of total pore volume that is contained in the pores having a pore diameter in the range of from 100-150 Å is less than 70%. It is also significant to note that at least 10% of the total pore volume is contained in pores having a diameter in the range of from 150 to 300 Å with at least 10% of the total pore volume being contained in pores having a diameter in the range of form 130 Å to 300 Å.

TABLE 1

| Properties of Catalyst A | |
|---|---|
| Properties | 704° C. |
| Calcination Temperature | (1300° F.) |
| MoO$_3$ | 11.85 |
| NiO | 2.75 |
| Hg Pore Size Dist. (Angstroms) | Percent |
| <70 | 2.86 |
| 70-100 | 16.4 |
| 100-130 | 37.24 |
| 130-150 | 13.26 |
| 150-180 | 7.09 |
| 180-200 | 2.53 |
| 200-240 | 2.97 |
| 240-300 | 2.65 |
| 300-350 | 1.51 |
| 350-450 | 1.9 |
| 450-600 | 1.8 |
| 600-1000 | 2.73 |
| 1000-3000 | 5.84 |
| 3000-5000 | 1.22 |
| >5000 | 0 |
| <100 A | 19.3 |
| 100-150 A | 50.5 |
| 150-300 A | 15.3 |
| >300 A | 15.0 |
| >1000 A | 7.1 |
| >5000 A | 0 |
| Total Pore Volume, cc/g | 0.66 |
| Medium Pore Diameter, Å | 124 |

EXAMPLE II

This Example II describes the preparation of Catalyst B, which is a co-mulled catalyst for comparison.

Catalyst B

The Catalyst B was prepared by first combining 2100 parts by weight alumina, 47.68 parts by weight nickel nitrate (Ni(NO$_3$)$_2$) dissolved in 64.18 parts by weight deionized water, and 900 parts by weight crushed regenerated Co/Mo/P hydrotreating catalyst containing 69% alumina, 23% molybdenum oxide, 5.5% cobalt oxide and 3.5% phosphorus pentaoxide) within a Muller mixer along with 64.56 parts by weight 69.7% concentrated nitric acid and 60 grams of a commercial extrusion aid. A total of 3900 parts by weight of water was added to these components during the mixing. The components were mixed for approximately 30 minutes.

133.56 parts of ammonium hydroxide (29.2% NMH$_3$) as further added mixed for an additional 5 minutes. The mixture had a pH of 7 and an LOI of 54.92 weight percent. The mixture was then extruded using 1.3 mm trilobe dies to form 1.3 trilobe extrudate particles. The extrudate particles were then dried in air for a period of several hours at a temperature of 125° C.

Aliquot portions of the dried extrudate particles were calcined in air each for a period of two hours at a temperature of 677° C. (1251° F.). The final calcined mixture contained 1.5 weight percent nickel metal (1.9 wt. % as NiO), 1.0 weight percent of cobalt (1.25 wt. % CoO) and molybdenum metal 5.3% (8.0 wt. % as MoO$_3$) and 88.18 weight percent of alumina and 0.72% of phosphorus pentaoxide.

The following Table 1 presents certain properties of the dried and calcined extrudate particles. As may be seen from the pore properties presented in Table 1, the percentage of the total pore volume contained in the macropores having a pore diameter of greater than 1000 Angstroms was significantly greater than 10% percent.

TABLE 2

Properties of Catalyst B

| Properties<br>Calcination Temperature | 677° C.<br>(1250° F.) |
|---|---|
| MoO$_3$ | 7.95 |
| NiO | 1.88 |
| CoO | 1.28 |
| Hg Pore Size Dist. (Angs) | |
| <70 | 2.6 |
| 70-100 | 33.8 |
| 100-130 | 20.0 |
| 130-150 | 2.9 |
| 150-180 | 2.0 |
| 180-200 | 0.8 |
| 200-240 | 1.0 |
| 240-300 | 1.0 |
| 300-350 | 0.4 |
| 350-450 | 0.5 |
| 450-600 | 0.6 |
| 600-1000 | 1.0 |
| 1000-3000 | 4.5 |
| 3000-5000 | 4.7 |
| >5000 | 24.3 |
| <70 | 2.6 |
| >250 | 36.7 |
| >350 | 35.6 |
| >1000 | 33.5 |
| >5000 | 24.3 |
| Total Pore Volume, cc/g | 0.92 |
| Medium Pore Diameter, Å | 113.4 |

EXAMPLE III

This Example III describes the preparation of Catalyst C, which is an impregnated catalyst for comparison.
Catalyst C (Impregnated Catalyst)

Preparation of a catalyst support for Catalyst C: A support was prepared by mulling 576 grams of alumina with 585 grams of water and 8 grams of glacial nitric acid for 35 minutes. The resulting mulled mixture was extruded through a 1.3 Trilobe™ die plate, dried between 90-125° C., and then calcined at 918° C., which resulted in 650 grams of a calcined support with a median pore diameter of 182 Å.

Impregnated Catalyst: The nickel/molybdenum catalyst was prepared in the following manner. Combined 9.2 parts of NiO, 8.3 parts of phosphoric acid (86.7% H$_3$PO$_4$), and 43.3 parts of molybdenum trioxide with 250 parts of water and heated at 93° C. (200° F.) for three hours until solution cleared. Diluted solution to 277.5 parts and impregnated 300 parts of support in a tumbler and shaking the tumbler, aged for 2 hours with occasional agitation, dried at 125° C. for several hours, and then calcined at 482.2° C. for 2 hours. The resulting catalyst contained 12% MoO$_3$, 2.5% NiO and 2.25% P$_2$O$_5$.

The impregnated catalyst had a pore size distribution with a median pore diameter of 215 Å, a pore volume of 0.738 cm$^3$/g, and a surface area of 136 m$^2$/g. Only 1.1% of the total number of pores were in the pore size distribution of more than 1000 Å and less than 0.5% were in pores greater than 5000 Å.

This example demonstrates the preparation of an impregnated Mo and Ni catalyst. Catalyst C contains a similar amount of NiO as does Catalyst A and a level of NiO that is similar to the combined amounts of NiO and CoO of Catalyst B. The MoO$_3$ content of Catalyst C is similar to that of Catalyst A.

TABLE 3

Properties of Catalyst C

| Properties<br>Calcination Temperature | 482° C.<br>(900° F.) |
|---|---|
| MoO$_3$ | 12.1 |
| NiO | 3.45 |
| P$_2$O$_5$ | 2.25 |
| Hg Pore Size Dist. (Angs) | Percent |
| <70 | 1.2 |
| 70-100 | 0.6 |
| 100-130 | 1.7 |
| 130-150 | 2.5 |
| 150-180 | 11.0 |
| 180-200 | 14.8 |
| 200-240 | 51.5 |
| 240-300 | 11.6 |
| 300-350 | 1.4 |
| 350-450 | 1.0 |
| 450-600 | 0.8 |
| 600-1000 | 0.8 |
| 1000-3000 | 0.9 |
| 3000-5000 | 0 |
| >5000 | |
| <100 | 1.8 |
| >100-150 | 4.2 |
| >350 | 3.5 |
| >150-300 | 88.9 |
| >300 | 4.9 |
| Total Pore Volume, cc/g | 0.637 |
| Medium Pore Diameter, Å | 216.5 |

EXAMPLE IV

This Example IV describes the method used in testing the catalysts described in Examples I, II, and III. This method provided for the processing of a feedstock having a significant sulfur concentration to yield a product having a reduced sulfur concentration. The feedstock also comprises significant nickel and vanadium concentrations.

Catalyst was loaded into a 1.5875 cm (⅝ inch) ID by 127 cm (50 inch) stainless steel tube reactor. The tube reactor was equipped with thermocouples placed in a 0.635 cm (¼ inch) thermowell inserted concentrically into the catalyst bed, and the reactor tube was held within a 132 cm (52 inch) long 5-zone furnace with each of the zones being separately controlled based on a signal from a thermocouple.

The catalyst bed was activated by feeding at ambient pressure a gas mixture of 5 vol. % H$_2$S and 95 vol. % H$_2$ to the reactor at a rate of 1.5 LHSV while incrementally increasing the reactor temperature at a rate of 38° C. (100° F.)/hr up to 204° C. (400° F.). The catalyst bed was maintained at a temperature of 204° C. (400° F.) for two hours and then the temperature was incrementally increased at a rate of 38° C. (100° F.)/hr to a temperature of 315° C. (600° F.), where it was held for one hour followed again by an incremental increase in the temperature at a rate of 24° C. (75° F.)/hr up to a temperature of 371° C. (700° F.), where it was held for two hours before cooling the catalyst bed temperature down to the ambient temperature. The catalyst bed was then pressured with pure hydrogen at 1900 psig, and the temperature of the catalyst bed was incrementally increased at a rate of 38° C. (100° F.)/hr to 204° C. (400° F.). The reactor was then charged with feedstock while the temperature of the reactor was held at 204° C. (400° F.) for one hour. The catalyst bed temperature was then incrementally increased at a rate of 10° C. (50° F.)/hr up 371° C. (700° F.), from which point the run was started.

The feedstock charged to the reactor was a Middle Eastern long residue. The distillation properties of the feedstock as determined by ASTM Method D 7169 are presented in Table 4. Other properties of the feedstock are presented in Table 5.

TABLE 4

Distillation of Middle Eastern Long Residue

| Wt. % | Temperature (° F.) |
|---|---|
| IBP | 522.0 |
| 10 | 721.0 |
| 20 | 806.0 |
| 30 | 871.0 |
| 40 | 932.0 |
| 50 | 999.0 |
| 60 | 1074.0 |
| 70 | 1159.0 |
| 80 | 1260.0 |
| 90 | 1343.0 |
| FBP | 1351.0 |

TABLE 5

Other Properties of the Feedstock

| H (wt %) | 11.01 |
|---|---|
| C (wt %) | 84.07 |
| O (wt %) | 0.085 |
| N (wt %) | 0.260 |
| S (wt %) | 4.575 |
| Ni (ppm) | 20.6 |
| V (ppm) | 70.0 |
| M (ppm) | 90.6 |
| BN (ppm) | 734 |
| MCR | 12.1 |
| 1000 F.+ | 49.1 |
| C7 asph | 5.5 |
| Density | 0.9819 @ 60° F. |
| P-Value | 2.8 |
| Viscosity | 6067 |
| c5-asph | 12.1 |

The feedstock was charged to the reactor along with hydrogen gas. The reactor was maintained at a pressure of 1900 psig and the feedstock was charged to the reactor at a rate so as to provide a liquid hourly space velocity (LHSV) of 1.00 $hr^{-1}$ and the hydrogen was charged at a rate of 4,000 SCF/bbl. The temperature of the reactor was set at 371° C. (700° F.).

This method provided for the processing of a feedstock having significant concentrations of sulfur, metals (Ni and V) and Conradson carbon. The reactor temperature was kept constant in conducting these reactions and the sulfur content was monitored. The inventive catalyst improved in activity as time on stream increased from time 0 to one month. Both of the comparative co-mulled catalyst and the impregnated catalyst decreased in activity with time. After about one month of processing the inventive catalyst exhibited nearly doubled the activity from the start of run activity, whereas, the impregnated catalyst lost about half of its initial activity for sulfur removal.

The following Table 6 illustrates the phenomenon of self-activation using the inventive catalyst. Although the phenomenon of self-activation was observed only for sulfur removal activity, the resultant beneficial activity effect was observed on other conversion activities like removal of Conradson carbon residue.

TABLE 6

Conversion activity of catalysts at the start of the run and approximately a month into the run.

| | Catalyst A | | Catalyst C | | Catalyst B | |
|---|---|---|---|---|---|---|
| Property Monitored | 150 hrs | 650 hrs | 150 hrs | 650 hrs | 150 hrs | 650 hrs |
| | | | Conversion, wt. % | | | |
| Sulfur | 53.3% | 64.2 | 70.9 | 55.5 | 53.3 | 40.7 |
| MCR | NA | 33.9 | NA | 28.8 | NA | 18.4 |

Presented in FIG. 1 is a plot of the desulfurization rate constant as a function of catalyst age for each of Catalyst A, Catalyst B and Catalyst C. The rate constants for each of Catalyst B and Catalyst C initially started out at a high level, but it is observed that the rate constant for each of the two catalysts declined with usage or age. However, it is observed that while the inventive Catalyst A initially started out with a lower rate constant, which may have been due to its low concentration of nickel, the rate constant increased with usage or age. This phenomena of self activation is unexpected, because the activity of most prior art catalysts tend to decrease with use.

FIG. 2 also shows Catalyst A exhibiting a self activation characteristic with its HDS activity improving with usage over time. The HDS activity of comparison Catalyst C (impregnated catalyst), on the other hand, had a higher initial HDS activity, but it declined with usage over time.

FIG. 3 presents comparison plots of the sulfur content of the liquid product resulting from the hydrodesulfurization of the residue feedstock using the inventive Catalyst A and comparison Catalyst C as a function of catalyst age. These data further demonstrate the self activation phenomena of the inventive catalyst.

EXAMPLE V

This Example V describes the preparation of Catalyst D, which is representative of one embodiment of the inventive catalyst, and, also, presents information in regard to a commercially available impregnated nickel/molybdenum catalyst.

Catalyst D

Catalyst D was prepared by first combining 2100 parts by weight alumina, 63.17 parts by weight nickel nitrate (Ni $(NO_3)_2$) dissolved in 85.04 parts by weight deionized water by heating, 217.05 parts by weight molybdenum trioxide ($MoO_3$) powder, and 900 parts by weight crushed Ni/Mo/P hydrotreating catalyst within a Muller mixer along with 130 parts by weight 69.9% concentrated nitric acid and 30 parts of a commercial extrusion aid. A total of 3222.9 parts by weight of water was added to these components during the mixing.

The components were mixed for approximately 30 minutes. The mixture had a pH of 4.12 and an LOI of 55.21 weight percent. The mixture was then extruded using 1.3 mm trilobe dies to form 1.3 trilobe extrudate particles. The extrudate particles were then dried in air for a period of several hours at a temperature of 100° C.

Dried extrudate particles were calcined in air for approximately a period of two hours at a maximum temperature of 788° C. (1450° F.). The final calcined mixture contained 2.2 weight percent nickel metal (2.8 wt. % as NiO), 7.9% molybdenum metal (11.9 wt. % as $MoO_3$), 82.6 weight percent of alumina, and 0.7% phosphorus.

The following Table 1 presents certain properties of the dried and calcined extrudate particles. As may be seen from the pore properties of the calcined extrudate presented in Table 1, the percentage of the total pore volume contained in the macropores having a pore diameter of greater than 350 (Å) is less than 20% with at least 1% of its pore volume is contained in pores having a diameter greater than 1000 Å, and the percentage of the total pore volume that is contained in its pores having a pore diameter in the range of from 70-250 Å is greater than 90%. The median pore diameter is at least greater than 115 Å and less than 155 Å.

TABLE 1

Properties of Catalyst A

| Properties | 788° C. |
|---|---|
| Calcination Temperature | (1450° F.) |
| $MoO_3$ | 11.85 |
| NiO | 2.75 |

| Range | Pore Volume - cc/g |
|---|---|
| 70-100 | 4.76 |
| 100-130 | 35.96 |
| 130-150 | 26.26 |
| 150-200 | 19.04 |
| 200-240 | 3.53 |
| 240-300 | 3.00 |
| 300-350 | 1.23 |
| 350-450 | 1.59 |
| 450-600 | 1.23 |
| 600-1000 | 1.06 |
| 1000-5000 | 1.23 |
| >5000 | 0.88 |
| <70 | 0.18 |
| Total Pore Volume, cc/g | 0.66 |
| Medium Pore Diameter, Å | 124 |

Catalyst E

Catalyst E is a commercially available finished nickel/molybdenum/phosphorus catalyst marketed by Criterion Catalyst Company. The catalyst includes nickel, molybdenum, and phosphorus on an alumina support. The catalyst is an impregnated catalyst as opposed to the co-mulled catalyst of the invention. Catalyst E contains 19.3% $MoO_3$, 4.62% NiO and 4.7% $P_2O_5$.

EXAMPLE VI

This Example presents the Raman spectra of Catalyst D (invention) and Catalyst E, each of which is described in the above Example V, and the procedure by which the Raman spectra were measured.

Samples of the inventive and comparison catalysts were prepared for Raman spectroscopy by individually crushing 0.25 grams of each catalyst sample in an agate mortar and pestle and grinding for 5 minutes until the samples reached the consistency of fine flour. The homogenized sample was then pressed into a pellet using a 13 mm infrared pellet press. Raman spectra were obtained on a Chromex Sentinel II fiber optic Raman spectrometer. Spectra were excited at 785 nm with 40 mW at the sample with 10 seconds exposure time and 20 scans co-added. Samples were checked visually before and after scans to look for any evidence of laser damage.

TABLE 7

Observed Raman Peak Positions for inventive Catalyst D and comparison Catalyst E

| Peak Number | Catalyst E ($cm^{-1}$) | Catalyst D ($cm^{-1}$) |
|---|---|---|
| 1 | 108 | 107 |
| 2 | 142 | 138 |
| 3 | 216 | 217 |
| 4 |  | 356 |
| 5 | 368 | 380 |
| 6 |  | 566 |
| 7 | 833 |  |
| 8 |  | 848 |
| 9 |  | 899 |
| 10 | 907 |  |
| 11 | 955 | 954 |
| 12 | 985 | 986 |
| 13 | 1051 |  |

Individual Raman spectra for Catalyst D and Catalyst E are shown in FIG. 4. The Raman spectra presented in FIG. 4 covers the frequency range of from about 200 $cm^{-1}$ to about 2100 $cm^{-1}$ of the Raman spectra for each of the inventive and comparison catalysts.

It is noted that the Raman spectra of the inventive Catalyst D exhibits certain Raman bands not expressed by the Comparison Catalyst E thereby making its characteristic Raman spectrum distinguishable over the Raman spectrum of the Comparison Catalyst E. For instance, the inventive catalyst exhibits Raman peaks at 566.4 $cm^{-1}$, 848.3 $cm^{-1}$, and 898.9 $cm^{-1}$, but the Comparison Catalyst does not exhibit Raman peaks at these frequencies.

The Raman spectrum of the inventive catalyst as compared to the comparison catalyst indicates that the inventive catalyst exhibits a different distribution of Mo=O stretching modes in the 900 $cm^{-1}$ 800 $cm^{-1}$ range with Raman spectra showing Mo=O bands at 848 $cm^{-1}$ and 899 $cm^{-1}$, implying a more ordered environment and less distortion of the $MoO_6$ component of the catalyst. Asymmetric $MoO_3$ bending is also more prominent for the inventive catalysts at 566 $cm^{-1}$ These differences in the Raman spectra demonstrate that the inventive catalyst is unique over the comparison catalyst, and, in particular, impregnated-type catalysts. The uniqueness of the inventive catalyst is further demonstrated by their improved catalytic performance as noted herein.

What is claimed is:

1. A self-activating hydroprocessing catalyst for treating heavy hydrocarbon feedstocks, wherein said catalyst comprises: a calcined particle comprising a co-mulled mixture made by co-mulling inorganic oxide powder, molybdenum trioxide in the form of small particles having a particle size in the range 0.2 to 150 μm, and a nickel compound and then forming said co-mulled mixture into a particle that is calcined at a temperature in the range from 700° C. (1292° F.) to 790° C. (1454° F.) to thereby provide said calcined particle, wherein said calcined particle comprises molybdenum that is present in an amount in the range of from 1 to 10 weight percent, as metal and based on the total weight of said calcined particle, and nickel that is present in an amount such that the weight ratio of said nickel-to-said molybdenum is less than 0.4, and wherein said calcined particle has a pore size distribution such that less than 70% of the total pore volume of said calcined particle is in the pores of said calcined particle having a diameter in the range of from 70 Å to 150 Å, at least 10% of the total pore volume of said calcined particle is in the pores of said calcined particle having a diameter in the range of from 130 Å to 300 Å, and less than 10% of the total pore volume of said calcined particle is in the pores of said calcined particle having a diameter greater than 1000 Å.

2. A catalyst as recited in claim 1, wherein said calcined particle comprises a material absence of cobalt.

3. A catalyst as recited in claim 2, wherein said calcined particle comprises less than 0.1 weight percent cobalt as metal and based on the total weight of said calcined particle.

4. A catalyst as recited in claim 3, wherein said calcined particle consists essentially of an inorganic oxide, molybdenum, and nickel.

5. A catalyst as recited in claim 4, wherein said calcined particle comprises nickel such that the weight ratio of said nickel-to-said molybdenum is greater than 0.01.

6. A catalyst as recited in claim 5, wherein said calcined particle comprises molybdenum in an amount that is less than 9.5 weight percent of the total weight of said calcined particle based on the molybdenum as metal.

7. A catalyst as recited in claim 6, wherein said calcined particle comprises molybdenum in an amount that is at least 2 weight percent of the total weight of said calcined particle based on the molybdenum as metal.

8. A catalyst as recited in claim 7, wherein at least 5% of the total pore volume of said calcined particle is in the pores of said calcined particle having a diameter of greater than 350 Å.

9. A catalyst as recited in claim 1, wherein the calcined particle is further characterized by and exhibits a Raman spectrum that includes a Raman peak within the band range of from 546 $cm^{-1}$ to 586 $cm^{-1}$.

10. A self activating hydroprocessing catalyst as recited in claim 1, wherein the calcined particle is further characterized by its Raman spectrum that includes a Raman peak within the band range of from 828 $cm^{-1}$ to 868 $cm^{-1}$.

11. A self activating hydroprocessing catalyst as recited in claim 1, wherein the calcined particle is further characterized by its Raman spectrum that includes a Raman peak within the band range of from 879 $cm^{-1}$ to 919 $cm^{-1}$.

12. A catalyst as recited in claim 1, wherein the atomic ratio of the nickel-to-molybdenum in the calcined particle is less than 0.4:1.

13. A catalyst as recited in claim 12, wherein the atomic ratio of the nickel-to-molybdenum in the calcined particle is in the range of from 0.01:0.3:1.

14. A catalyst as recited in claim 1, wherein the particle size of the molybdenum trioxide is in the range from 0.3 to 100 µm.

15. A process comprising: contacting, under process conditions suitable for providing for the self activation of a self activating catalyst, a heavy hydrocarbon feedstock having a nickel content in the range of from 2 ppmw to 250 ppmw, a vanadium content in the range of from 5 ppmw to 250 ppmw, and a sulfur content in the range of from 2 wt % to 8 wt %, with said self activating catalyst that comprises a calcined particle comprising a co-mulled mixture made by co-mulling inorganic oxide powder, molybdenum trioxide in the form of small particles having a particle size in the range 0.2 to 150 µm, and a nickel compound and then forming said co-mulled mixture into a particle that is calcined at a temperature in the range from 700° C. (1292° F.) to 790° C. (1454° F.) to thereby provide said calcined particle, wherein said calcined particle comprises molybdenum that is present in an amount in the range of from 1 to 10 weight percent, as metal and based on the total weight of said calcined particle, and nickel that is present in an amount such at the weight ratio of said nickel-to-molybdenum is less than 0.4, and wherein said calcined particle has a pore size distribution such that less than 70% of the total pore volume of said calcined particle is in the pores of said calcined particle having a diameter in the range of from 70 Å to 150 Å, at least 10% of the total pore volume of said calcined particle is in the pores of said calcined particle having a diameter in the range of from 130 Å to 300 Å, and less than 10% of the total pore volume of said calcined particle is in the pores of said calcined particle having a diameter greater than 1000 Å.

16. A process as recited in claim 15, wherein said process conditions includes a reaction pressure in the range of from 2298 kPa (300 psig) to 20,684 kPa (3000 psig); reaction temperature in the range of from 340° C. (644° F.) to 480° C. (896° F.); a liquid hourly space velocity (LHSV) in the range of from 0.01 $hr^{-1}$ to 3 $hr^{-1}$; and a hydrogen treat gas rate in the range of from 89 $m^3/m^3$ (500 SCF/bbl) to 1781 $m^3/m^3$ (10,000 SCF/bbl).

17. A process as recited in claim 16, wherein said calcined particle comprises a material absence of cobalt.

18. A process as recited in claim 17, wherein said calcined particle comprises less than 0.1 weight percent cobalt as metal and based on the total weight of said calcined particle.

19. A process as recited in claim 18, wherein said calcined particle consists essentially of an inorganic oxide, molybdenum, and nickel.

20. A process as recited in claim 19, wherein said calcined particle comprises nickel such that the weight ratio of said nickel-to-said molybdenum is greater than 0.01.

21. A process as recited in claim 20, wherein said calcined particle comprises molybdenum in an amount that is less than 9.5 weight percent of the total weight of said calcined particle based on the molybdenum as metal.

22. A process as recited in claim 21, wherein said calcined particle comprises molybdenum in an amount that is at least 2 weight percent of the total weight of said calcined particle based on the molybdenum as metal.

23. A process as recited in claim 22, wherein at least 5% of the total pore volume of said calcined particle is in the pores of said calcined particle having a diameter of greater than 350 Å.

24. A process as recited in claim 23, wherein the calcination of said particle to provide said calcined particle is conducted under a controlled temperature condition in which the calcination temperature is in the range of from about 700° C. (1292° F.) to about 787.7° C. (1450° F.) for a calcination time period that is effective to provide said calcined mixture having a desired pore structure.

25. A process as recited in claim 16, wherein the calcined particle is further characterized by its Raman spectrum that includes a Raman peak within the band range of from 828 $cm^{-1}$ to 868 $cm^{-1}$.

26. A process as recited in claim 16, wherein the calcined particle is further characterized by its Raman spectrum that includes a Raman peak within the band range of from 879 $cm^{-1}$ to 919 $cm^{-1}$.

27. A process as recited in claim 16, wherein the calcined particle wherein is further characterized by and exhibits a Raman spectrum that includes a Raman peak within the band range of from 546 $cm^{-1}$ to 586 $cm^{-1}$.

* * * * *